United States Patent [19]

Hoffman et al.

[11] Patent Number: 4,635,121

[45] Date of Patent: Jan. 6, 1987

[54] ARRANGEMENT FOR THE PROGRAMMABLE CONTROL OF A RADIO AND/OR TELEVISION RECEIVER

[75] Inventors: Hans Hoffman, Quickborn; Frank Heubach, Hamburg, both of Fed. Rep. of Germany

[73] Assignee: U.S. Philips Corporation, New York, N.Y.

[21] Appl. No.: 553,730

[22] Filed: Nov. 21, 1983

[30] Foreign Application Priority Data

Nov. 25, 1982 [DE] Fed. Rep. of Germany ....... 3243610

[51] Int. Cl.$^4$ .......................... H04N 5/50; H04B 1/16
[52] U.S. Cl. ................................ 358/188; 358/191.1; 358/337; 455/166; 455/181
[58] Field of Search ............ 358/188, 181, 189, 191.1, 358/198, 335, 337, 310, 320; 455/166, 177, 184, 186, 181, 185, 179

[56] References Cited

U.S. PATENT DOCUMENTS

| | | | |
|---|---|---|---|
| 4,081,754 | 3/1978 | Jackson | 455/181 |
| 4,337,480 | 6/1982 | Bourassin | 358/188 |
| 4,348,696 | 9/1982 | Beier | 358/188 |
| 4,360,831 | 11/1982 | Kellar | 358/182 |
| 4,435,842 | 3/1984 | Mayumi | 455/181 |
| 4,488,179 | 12/1984 | Kruger et al. | 358/188 |
| 4,510,623 | 4/1985 | Bonneau | 455/181 |

OTHER PUBLICATIONS

New Ancillary Services Using a Television Channel, by Bernard Marti, vol. 86, Nov. 1977, SMPTE Journal, pp. 815 to 818.
Farbempfanger mit einfacher Vorprogrammierung, by Kurt Knuth, Funkschau 1978, Heft 9, pp. 405–407.

*Primary Examiner*—Tommy P. Chin
*Attorney, Agent, or Firm*—Thomas A. Briody; Jack Oisher; William J. Streeter

[57] ABSTRACT

When programming a radio and/or television receiver for future transmissions, problems may occur due to overlapping of the programmed transmissions. For this purpose the individually programmed transmissions are provided with priority data which control the sequence in the event of overlapping transmissions. In the same way given transmissions can also be provided with blocking data which block the reception or reproduction, respectively, thereof. The use of the priority data is particularly efficient when the transmissions are controlled in addition or exclusively by transmitted identification numbers and consequently are only received during the actual transmission time, as then shifts with respect to the planned transmission times cannot be foreseen. Additional possibilities are derived from the storage of data characterizing the type of the transmission, when these data are transmitted simultaneously with the relevant transmission.

5 Claims, 1 Drawing Figure

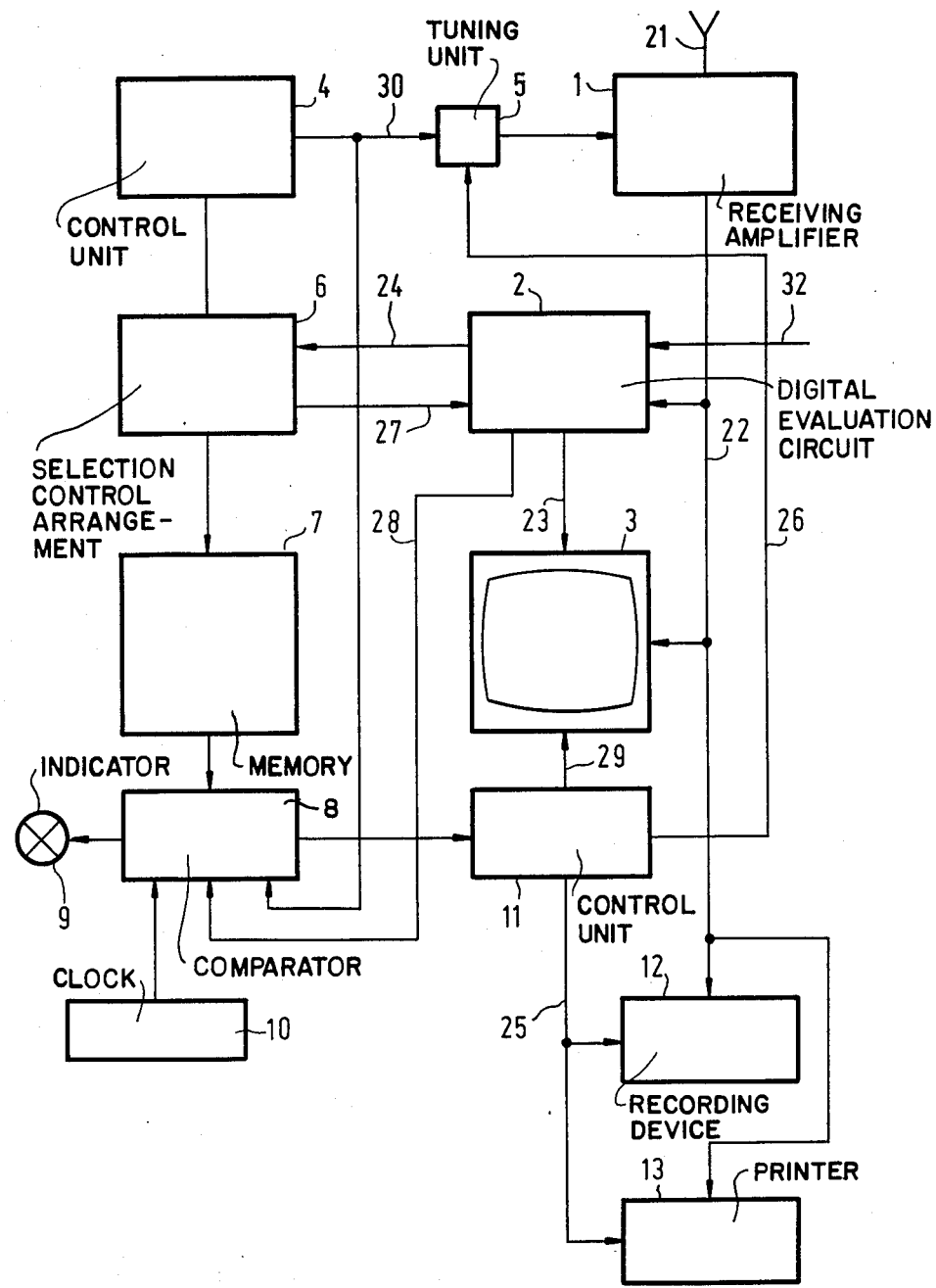

ARRANGEMENT FOR THE PROGRAMMABLE CONTROL OF A RADIO AND/OR TELEVISION RECEIVER

BACKGROUND OF THE INVENTION

The invention relates to an arrangement for the programmable control of a radio and/or television receiver comprising a memory for storing and outputting transmission programming data entered by the user via a control arrangement, and comprising a comparator which compares the programming data to identification signals and when there is agreement triggers a control in the receiver which effects recording or reproduction of the receiving signals via the receiver.

For television receivers such arrangements are known, from, for example, the periodical "Funkschau" 1978, No. 9, pages 405–407. Therein the programming data contain the time at which a transmission is scheduled to start and the identification signals are the signals produced by an electronic clock.

In addition, from the periodical "SMPTE Journal" Nov. 1977, pages 815–818 it is known that the programming data of television transmissions contain a number which is associated with a given transmission and which is transmitted simultaneously. This is a time-independent system so that, more specifically when such a transmission is automatically recorded on magnetic tape, only the actually desired transmission is recorded, independent of time shifts with respect to the scheduled time of the transmission.

With the prior art arrangements for a programmable control, a plurality of control functions are indeed already possible which facilitate the use of a television receiver or a recording arrangement connected thereto, respectively. However, in certain circumstances problems may arise, for example when the transmission times of different transmissions programmed for recording or storage overlap.

SUMMARY OF THE INVENTION

It is an object of the invention to construct an arrangement for the programmable control of a radio and/or television receiver of the above-described type in such a way that the ease of control is improved by increasing the number of control features and, more specifically, that in the event of overlapping transmission time unambiguous and predictable functions are effected.

According to the invention, this is accomplished in that the memory also comprises for each programmed transmission priority data which indicate a priority determined by the user, and/or blocking data, one value of which blocks the reproduction of the associated transmission, and that the comparator also compares the priority data and only applies to the control arrangement the programming data which correspond to the identification signals and whose priority data distinguish themselves in a predetermined manner from the priority data of the programming data of other transmissions. The use of additional priority data renders it possible to make an unambiguous decision and to indeed fully reproduce the higher-priority transmissions, also in conflicting situations, in which two programmed transmission are received at least partially simultaneously. The use of blocking data which may be considered as being the most negative priority data renders it more specifically possible to provice a "program blocking feature for children" by providing the programming data of given transmissions which children are not allowed to see or to hear in, for example, the absence of the parents, with blocking data. This enables a more flexible use of the programmability of transmission and said feature is also applicable to mere sound receivers.

When during the reception of a transmission a different, but also programmed transmission having the same priority starts, which may occur, more specifically, in the case of unforeseen time shifts of transmissions, the transmission already in progress must still be further reproduced or recorded, respectively. To ensure, however, particularly in the case of the presentation of transmissions, that the user sees that two transmissions having the same priorities are received, it is efficient to have the comparator produce a "collision signal", more specifically during the time in which there is agreement between the priority data of more than one transmission whose programming data correspond to the identification signals. This offers the possibility to the user to check the beginning of the transmission having the same priority but starting later and to change, if so desired, his original priority decision.

Applying the programming data can be effected in different ways, for example by means of a remote control arrangement or alternatively by means of a bar code reader when the Radio Times have been provided with bar codes for the various transmissions. There is a further possibility for receivers having additional decoders, more specifically television receivers having teletext and view-data arrangements, namely that the programming data in the received data which are displayed as characters on the picture screen of the television receiver are chosen on the picture screen by optical marking by means of a "cursor" which is controlled by the control arrangement and are entered into the memory by further control signals from the control arrangement, it being possible to add the priority data and the blocking data via the control arrangement. Acting thus, only a small number of data need be entered via the control arrangement, particularly via the remote control arrangement, so that a simple user's operation of the arrangement is obtained. Programming an audio receiver can be effected in the same way. It is not necessary that the received data are received only via the aerial, but they may alternatively be received via a telephone connection.

The identification signals which are compared in the comparator to the programming data can be generated in different ways or may originate from different sources. One possibility is that the identification signals are the timing signals of an electronic clock present in the receiver. A further possibility is that the identification signals are derived from the received signals. The received signals may then be time signals from an electronic clock present in the transmitter, or they may be encoded control signals which are specially added to the transmissions. In the latter case, it is efficient with a television receiver that the identification signals are derived from data signals transmitted in intervals during the scanning of picture signals in the receive signal.

Particular advantages are obtained with a combination of the above-mentioned features, more specifically in that the identification signals are both the time signals from an electronic clock as well as signals derived from receiving signals and that the comparator checks whether there is simultaneous agreement between all the identification signals and the programming data. This renders it possible to program and time rangers and time windows, respectively, in which transmissions of a certain type, such as, for example, politics, sports, science, amusement are transmitted without the need to program these transmissions separately. It is then of course a condition that with each transmission, a signal or a digital information, respectively, is transmitted which indicates the type of program in which this transmission is classified.

DESCRIPTION OF THE DRAWING

An embodiment of the invention for a television receiver will now be described in greater detail, by way of example, with reference to the accompanying drawing in which the sole FIGURE shows a block diagram of a television receiver incorporating the invention.

DESCRIPTION OF THE PREFERRED EMBODIMENT

With the receiver shown in the FIGURE, the RF signals received at the aerial 21, which signals may be, alternatively, signals received from satellites in a very high frequency range and converted or signals received via a cable, are applied to a customary selective RF and IF-ampifiers with demodulator, which apply the demodulated signal, inclusive of the co-transmitted digital information, to the conductor 22. Tuning the receiving amplifier 1 to a given transmitter is effected by means of the tuning unit 5, which is controlled by a control unit 4 via the conductor 30 and also by a control unit 11 via the conductor 26.

The demodulated picture and sound signal present on the conductor 22 is applied to a display device 3 comprising a picture tube with associated customary deflection circuits and also a sound amplifier with loudspeaker. The signal on the conductor 22 is further applied to a recording device 12 which may be in the form of a video recorder and also, if so desired, to further recording equipment, for example a printer 13. The recording devices 12 and 13 are also controlled, at least by the control unit 11 via the conductor 25.

In addition, the signal on the conductor 22 is applied to a digital evaluation circuit 2 which separates the digital information transmitted with the picture signal, particularly during the scanning periods, from the picture signal, and decodes and records, at least partially, this digital information. Digital information may alternatively be applied to the digital evaluation circuit 2 from a telephone connection via the conductor 32. This digital information comprises text of graphic information and is applied via the conductor 23 to the display device 3, where the digital information can be optionally displayed instead of the picture information on the conductor 22. In this situation, it is assumed that the signal transmitted via the conductor 23 are already the picture signals for direct control of the display device 3, obtained from the digital information via a character generator.

In the case of a mere sound receiver, the digital signals are separated from the sound signal and optionally displayed on, for example, a one-line indicator device, when these signals are not only to be used for control purposes.

The digital information items are further applied via the conductor 24 to a selection control arrangement 6, which also receives control signals from the control unit 4 which may, for example, be the receiving section of a remote control. The output of the selection control arrangement 6 is connected to a memory 7 for a plurality of program data which can wholly or partly be entered by the user via the control unit 4. In addition, a character reader may be connected to the control unit 4, by means of which reader the user can, for example, read character codes from the Radio Times and enter them as programming data into the memory 7 via the selection control arrangement 6. When the digital information items received in the digital evaluation circuit 2 is a program survey or a portion thereof, these information items can also be applied to the selection control arrangement 6 via the conductor 24. These digital information items then contain, in addition to the designation of the transmissions, also the date and the time of the planned transmission as well as the indication of the transmitter and any other information about the relevant transmission. Control signals which mark a predetermined transmission of the program survey shown on the display device 3, for example by means of a "cursor" or by underlinning or inverting the relevant line in the program survey, can be transmitted to the digital evaluation circuit 2 by means of the control unit 4 and the selection control arrangement 6 via the conductor 27. The position of this character can be shifted upwards or downwards, that is to say to a different transmission, by the control unit 4. When a store command is entered into the memory 7 via the control unit 4, the most important digital information associated with the marked transmission and applied to the selection control arrangement 6 via the conductor 24 are stored in the memory 7 as the programming data. In addition, still further information can be added via the control unit 4, as will be described in greater detail hereinafter.

The programming data from the memory 7 are applied to a comparator 8 where they are compared with identification data. These data are formed more specifically by time signals originating from an electric clock 10 present in the receiver, and indicate the date and the time. Instead of the time signals from the electronic clock 10, time signals derived from the received digital information may alternatively be used and, in addition, the programming data from the memory 7 can alternatively be compared with predetermined digital signals present in the picture signal (or in the sound signal in the case of a sound receiver) on the conductor 22, which are applied from the digital evaluation circuit 2 to the comparator 8 via the conductor 28. Furthermore, the tuning signal from the control unit 4 is applied to the comparator 8.

An output of the comparator 8 leads to the control unit 11 and applies control signals thereto when predetermined programming data read from the memory 7 correspond, at least partly, to the identification signals applied to the comparator 8. This control arrangement unit 11 controls, in accordance with the corresponding programming data, the display device 3 and also, via the conductor 26, the tuning unit 5 and optionally the recording arrangements 12 and 13. In certain circumstances still to be illustrated hereinafter, the comparator 8 also controls an indicator 9.

To explain in detail the function of the arrangement shown, which in a similar way also applies to sound receivers, let it first be assumed that on the reception of a transmission, no other data characterizing this transmission are received so that the comparator 8 only receives the signals from the electronic clock 10. Then, the programming data in the memory 7 contain, for each programmed transmission, only the times at which the transmission begins and ends, and also the details of the transmitter or the frequency, respectively thereof, which are read into the memory 7 in one of the abovementioned ways via the control unit 4, and, in addition, a priority numer and a blocking data which are also entered into the memory via the control unit 4 together with further programming data of the relevant transmission.

During operation, the programming data of the several transmissions are consecutively read from the memory 7 and applied to the comparator 8. This can be effected by means of an address generator, in the form of a counter for the memory 7, which for the sake of clarity of the Figure is not further shown in the Figure. The comparator 8 compares the information contained in the programming data and indicating the time, with the data produced by the electronic clock 10 and when there is agreement between these data for a given programmed transmission, the associated data of the frequency of the transmitter are applied via the control unit 11 and the conductor 26 to the tuning unit 5 which tunes the receiving amplifier 1 to the relevant transmitter. At the same time the comparator 8 effects an intermediate storage of the priority number stored for this programmed transmission.

Also after a programmed transmission has been found, repeated reading of the memory 7 is continued and when now a different, programmed transmission is found, whose data, as regards the time, correspond to the data supplied by the electronic clock 10, the priority number of this other transmission is compared with the intermediately stored priority number. If the priority number of the other transmission exceeds the intermediately stored priority number, the higher priority number is stored intermediately and the associated frequency data are applied to the tuning unit 5 so that now the transmission having the higher priority number is reproduced. In this way an unambiguous decision is taken also when, accidentally, two transmissions which start at the same time or have at least partly the same time of transmission are programmed.

If, however, two transmission having the same priority number and which overlap at least partly have been stored, that is to say the priority number of the other transmission is of the same value as the intermediately stored priority number, there are at least two possibilities to make a decision. On the one hand, the transmission already set or the transmission already in progress, respectively, whose priority number has been intermediately stored can be further reproduced or recorded, respectively, the comparator 8 then, however, controlling the indicator 9 to bring to the user's notice that at least two transmissions having the same priority number and for the same time have been stored. The user can then decide if he wants to swtich over to the other transmission. On the other hand, also the transmission found last in the memory 7 can be set, the indicator 9 then also being operated. Also then the user gets the possibility to switch back to the previously received transmission. The choice between the two possiblities can be preset by the set maker or be adjustable by the user.

When, for a stored transmission, the data indicating the time correspond to the data produced by the electronic clock 10, but the blocking data being present or blocking being indicated, respectively, the comparator 8 compares the associated frequency data, for example the channel number of this transmission to the frequency data applied via the conductor 30, which data are indicative of the transmission just adjusted to as such a transmission can then only have been set via the control unit 4. When the frequency data agree, the comparator 8 applies a blocking signal to the control unit 11, causing the display or indication, respectively, of the set transmission to be blocked via the conductor 29. As soon as a different transmitter is set via the control unti 4, the blocking is automatically released as then there is no agreement between the transmitter data from the memory 7 and the transmitter data set by the control unit 4.

Since the blocking data only comprise a simple yesno indication, 1 bit is sufficient for this purpose, that is to say one memory location in the memory 7 for the data block associated with a transmission. On the other hand the storage of a positive polarity number for such a transmission has of course no sense at all, so that the locations for the priority data for storing blocking data can also be utilized, for example by not comparing the lowest or the negative priority, respectively to any, intermediately stored priority, but by evaluating it as a blocking signal.

In addition to the priority data and blocking data, still further data can be stored in the memory 7, indicating that the desired transmission is not shown on the display device 3 but is recorded by the recording device 12 or is to be printed by means of the printer 13, respectively. For that purpose the control unit 11 controls the relevant equipment via the conductor 25, which indeed represents a multiple conductor. Also then the possibility to store priority data can be applied advantageously, by storing each transmission having the highest priority in the event, for example, of overlapping transmissions.

During the storage of programming data for a transmission, it is further possible, when the user does not add any explicit priority data, to add automatically priority data having, for example, an average priority. In this way an unambiguous decision is possible for any stored transmission.

If a full program survey of all transmissions is supplied with each transmission, particularly in a predetermined picture line during the retrace, the programming data stored in the memory 7 can be displayed in a convenient way. For this purpose, the memory 7 is now not read cyclically, but first only the programming data of the first transmission are read and simultaneously the received digital survey data are decoded in the digital evaluation circuit 2 and applied to the comparator 8 via the conductor 28. As soon as the programming data correspond to the survey data, the further data, which form the clear text of the relevant transmission, are stored in the digital evaluation circuit 2. Subsequent thereto, the programming data of the next transmission are read from the memory 7 and, in a corresponding way, the data for the text of the second stored transmission are stored in the digital evaluation circuit 2. When, in this way, all programming data in the memory 7 have been compared to the survey data and the corresponding text data have been stored in the digital evaluation circuit 2, they are applied to the display device 3 via the coductor 23, so that now the complete list of the stored transmissions with all the essential indications appears.

In a further extension of the received program survey data, each transmission in the program survey can be provided with an individual identification number which, on presentation of the program survey, need not to be displayed absolutely. In such an extension stage, not only the time data of a selected transmission or instead, the corresponding data, are stored in the memory 7, but also the corresponding identification number with the priority data and the blocking data. In that case, when setting a programmed transmission, not only the characteristic data of the electronic clock 10 but also, or instead thereof, the identification numbers of the current transmission which numbers are decoded by the digital evaluation circuit 2, are decoded and applied to the comparator 8 via the conductor 28. The further procedure, particularly also the priority control or the blocking operation, is effected in the same way as in a pure time comparison. Now however, there is the advantage that in those cases in which a shift of an actual transmission time with respect to the time indicated in the Radio Times and to which the set was programmed, a program transmission is now actually not switched on and reproduced or recorded, respectively until it really starts. A proper functioning of the arrangement is then also guaranteed in the event of overlapping transmissions, which were not foreseen in the program planning as at all times only that transmission is reproduced or recorded, respectively, whose programming data contain the highest priority number. The control in the event of overlapping transmissions have the same priority can be different for reproduction than for recording. It is alternatively possible to use several recording apparatuses, connected to the described arrangement for the separate recording of overlapping transmission.

Still further applications of the described arrangement are obtained, when, in addition to the identification numbers of the transmissions, also data in the program survey or data transmitted with the actual transmission which indicate the type of transmission, these types of transmissions being, for example, the news, sporting events, political broadcasts, musical programs etc., are transmitted. When it is assumed that the data indicating the type of program are additional data, it is possible to store as program data a program type together with a time or a time range instead of the time or the identification number, respectively, of a given transmission. Also here the additional storage of priority data and blocking data is possible in an identical way. The data indicating the type of the transmission received are also applied to the comparator 8 from the digital evaluation circuit 2 via the conductor 28. As a result thereof, all transmissions within the programmed time range determined by comparing the data from the electronic clock 10 in the comparator 8 are indicated, the type in accordance with the data applied to the comparator 8 via the conductor 28 corresponding to the programmed data, is displayed on the reproducing device 3 or recorded by means of the recording device 12. When in addition certain transmissions are programmed which fall within this time range, they can be treated with precedence or in dependence on the priority programmed therewith.

In a corresponding manner it is therefore possible to program time ranges in which predetermined types are blocked.

Thus it is possible to effect with the described arrangements with only little trouble and at low cost, a significantly more flexible and more comfortable programming operation which satisfies to a very high extent the requirements of a user, compared to a simple preselection of certain tranmsissions at certain times.

What is claimed is:

1. An arrangement for programmably controlling a radio and/or televison receiver having means for receiving various transmissions, a tuning unit for tuning said receiving means to one of said various transmissions, and a display for displaying said one transmission, said arrangement including a control unit with which a user enters sets of programming data including the dates, times, and transmitters of transmissions to be transmitted in the future, a memory for storing said sets of programming data, a clock for generating identification data including the current data and time, a comparator circuit for comparing the date and time in each set or programming data stored in said memory with said identification data, and a further control unit which, in response to said comparator circuit, causes said tuning unit to tune said receiving means to the transmission corresponding to the set of programming data having the date and time which agree with said identification data, said further control unit also activating said display for displaying said transmission, characterized in that said programming data further includes priority data and blocking data, both selected and entered by the user via said control unit and stored with each set or programming data in said memory, said comparator circuit comprising means for detecting said blocking data and for preventing said further control unit from activating said display when a set of programming data containing said blocking data includes a date and time which agree with said identification data, and said comparator circuit further comprising intermediate storing means for storing the priority data of the transmission being displayed, said comparator circuit further comparing said intermediately stored priority data with the priority data of another set of programming data having a date and time which agree with said identification data, thereby providing another comparison criterion for said comparator circuit.

2. An arrangement as claimed in claim 1, characterized in that the arrangement further comprises an indicator coupled to said comparator circuit, said comparator circuit producing a "collision signal" for said indicator during the period of time in which there is agreement between the priority data of more than one set of programming data having dates and times which correspond to the identification data.

3. An arrangement as claimed in claim 1 or 2, wherein said receiver comprises an additional decoding arrangement for displaying text on the display of said receiver, characterized in that said text comrpises sets of programming data for transmissions to be transmitted, which text is displayed on said display as characters, said sets of programming data being selectively written into the memory under control of said control unit, the priority data and the blocking data being added via the control unit.

4. An arrangement as claimed in claim 1 or 2, characterized in that the identification data additionally include signals in transmissions being received by said receiving means.

5. An arrangement as claimed in claim 4, characterized in that said signals are data signals transmitted during scanning intervals in picture signals in the transmissions being received.

* * * * *

UNITED STATES PATENT AND TRADEMARK OFFICE
CERTIFICATE OF CORRECTION

PATENT NO. : 4.635.121
DATED : January 6. 1987
INVENTOR(S) : Hans Hoffman. et al It is certified that error appears in the above-identified patent and that said Letters Patent is hereby corrected as shown below:

<u>IN THE CLAIMS</u>

Claim 1. line 11    Change "data" to --date-- line 23    Change "or" to --of--

Claim 3. line 4     Change "comrpises" to

--comprises--

Signed and Sealed this

Thirty-first Day of January, 1989

*Attest:*

DONALD J. QUIGG

*Attesting Officer*        *Commissioner of Patents and Trademarks*